United States Patent [19]

Häner

[11] Patent Number: 5,560,152
[45] Date of Patent: Oct. 1, 1996

[54] DROP WINDOW INTENDED FOR A MOTOR VEHICLE

[75] Inventor: Bernhard Häner, Nauheim, Germany

[73] Assignee: General Motors Corporation, Detroit, Mich.

[21] Appl. No.: 373,993

[22] Filed: Jan. 17, 1995

[30] Foreign Application Priority Data

Apr. 2, 1994 [DE] Germany .................. 44 11 571.7

[51] Int. Cl.⁶ .................................................. E05F 11/38
[52] U.S. Cl. .................. 49/348; 49/327; 49/351; 49/502
[58] Field of Search ................ 49/502, 327, 348, 49/349, 350, 351, 352

[56] References Cited

U.S. PATENT DOCUMENTS 4,586,290  5/1986  Juechter .................... 49/348
4,956,942  9/1990  Lisak et al. ................ 49/502
4,984,389  1/1991  Benoit et al. .............. 49/227 X

FOREIGN PATENT DOCUMENTS

2435766C3  9/1978  Germany .

Primary Examiner—Philip C. Kannan
Attorney, Agent, or Firm—Ernest E. Helms

[57] ABSTRACT

A guide sleeve designed as a separate component is pushed onto the upper end of a guide rail of a drop window. This guide sleeve guides a window pane as soon as the window pane has almost reached its uppermost position. By means of an eccentric screw or other adjusting means, it is possible to adjust the position of the guide sleeve relative to the guide rail and thus to achieve the correct tension and position of the window pane in its final position.

7 Claims, 2 Drawing Sheets

DROP WINDOW INTENDED FOR A MOTOR VEHICLE

FIELD OF THE INVENTION

The invention relates to a drop window intended for a motor vehicle with a window pane that can be raised in two side guide rails from a lowered position to an open window position where the means for adjustment of the position of the totally raised window pane are provided transversely to the plane of the window opening and in which at the upper end of the rear guide rail a guide sleeve is situated in which sliding pieces of the window pane engage the window pane immediately before it reaches its uppermost position.

BACKGROUND OF THE INVENTION

Drop windows of this type are present in the doors of modern motor vehicles and therefore are generally well known. They are used in coupes and cabriolets which have a frameless door. On conventional vehicles, the necessary tension is achieved by slanting the guide rails transversely to the direction of travel. When the window pane is raised, immediately before reaching its end position it undergoes a pivoting motion through which it is pressed against the pane seal. However, prior windows do not have means for adjusting the position of the window pane in the closed state. Therefore, the guide rails of the drop window must be very precisely aligned in order to avoid differences in alignment between the closed window pane and the outer skin of the vehicle.

In motor vehicles known in practice, it is known that adjusting means are provided on both guide rails of the window pane inside the door structure which make it possible to swivel the lower ends of the guide rails transversely to the plane of the door. The disadvantage here, however, is that both guide rails must always be uniformly adjusted so that they remain aligned parallel with one another. If only one guide rail were adjusted, the window pane would be twisted such that the forces necessary for its adjustment would have to be increased considerably over its entire stroke distance. In many vehicles, an adjustment of the two guide rails is impossible because the front guide rail is raised up out of the door opening nearly to the roof and is firmly connected to a window frame. Add to this the fact that in the lower region of modern motor vehicles, usually a brace, as a side collision protection, is provided which occupies the space for the adjusting means.

SUMMARY OF THE INVENTION

The invention has the problem of devising a drop window of the type described in such a way that an adjustment of the position of its window pane relative to the contour of the motor vehicle can be performed as simply as possible and such that the construction costs are low.

This problem is solved according to the invention by the fact that the guide sleeve is a component extending over the guide rail from the rear side of the vehicle. Also, this guide sleeve is separate from the guide rail, and the adjusting means are designed to adjust the guide sleeve transversely to the plane of the window pane.

With such a drop window, in order to adjust the position of the window pane in the closed state and therefore also its pressing force against the pane seal, instead of adjusting the guide rail one adjusts a guide sleeve. Since the guide sleeve lies at the upper end of the guide rail, the adjusting means can be provided in the region of the upper end of the guide rail so that the side collision protection does not stand in the way of this arrangement. The invention also envisions a guide sleeve on only one guide rail. Then shortly before the upper end position of the window pane is reached, the window pane is twisted and its passage thus impeded, but this can be accepted. If a single guide rail were adjusted alone, the passage would be difficult over the entire stroke region. Because of these conditions, the invention is especially well suited for vehicles in which a window pane is guided by a guide rail integrated in a door frame nearly up to the roof, since then a uniform adjustment of both guide rails is impossible. Another advantage of the invention is that during the production of the drop window, one can use components which are also required for other drop windows so that their manufacture requires only a low cost.

The drop window is especially simple in design if, according to another version of the invention, the guide sleeve is connected in a releasable manner to stationary parts of the motor vehicle at the two opposite ends in the guiding direction. With such a design, the possibility exists of moving the window pane into the correct position before the guide sleeve is finally fixed, e.g., by screws. Of course, it is also possible to use a screw as a pivot axis for the guide sleeve and to pivot the guide sleeve on the opposite side, which can be done by means of any arbitrarily-designed adjusting means (eccentric adjustment, cam path, adjusting screw, oblique plane).

To attach the guide sleeve, according to another version of the invention, the guide sleeve is connected at its upper end by a screw serving at the same time for fixation of the guide rail to a stationary part of the motor vehicle. This screw passes into the vehicle structure through the base of the guide rail and the base of the guide sleeve.

One variant of the invention of simple design consists in the fact that the guide sleeve displays on its bottom side an extension with a screw strap for attachment to the vehicle structure.

The guide sleeve can be preassembled with the guide rail as a structural component if the guide sleeve is attached exclusively to the guide rail.

An exact adjustment of the window pane is easily and conveniently possible if, according to another version of the invention, the guide sleeve is held at one end by an adjustable eccentric screw as the adjusting means to a stationary part of the vehicle.

The adjustment by means of an eccentric screw is optimally configured if the eccentric screw is simultaneously the means for fixation of the upper end of the guide rail and wherein the screw has a first not eccentric region which passes through a boring in the base of the guide rail, that after the first region the screw has a second eccentric region following the first region which engages a boring at the base of the guide sleeve and onto which a nut is screwed on the side of the screw facing away from the guide rail.

The invention permits numerous variations. For further illustration of this basic principle, two of them are shown in the drawing and are described in the following.

DESCRIPTION OF THE PREFERRED EMBODIMENT

Figure 1:
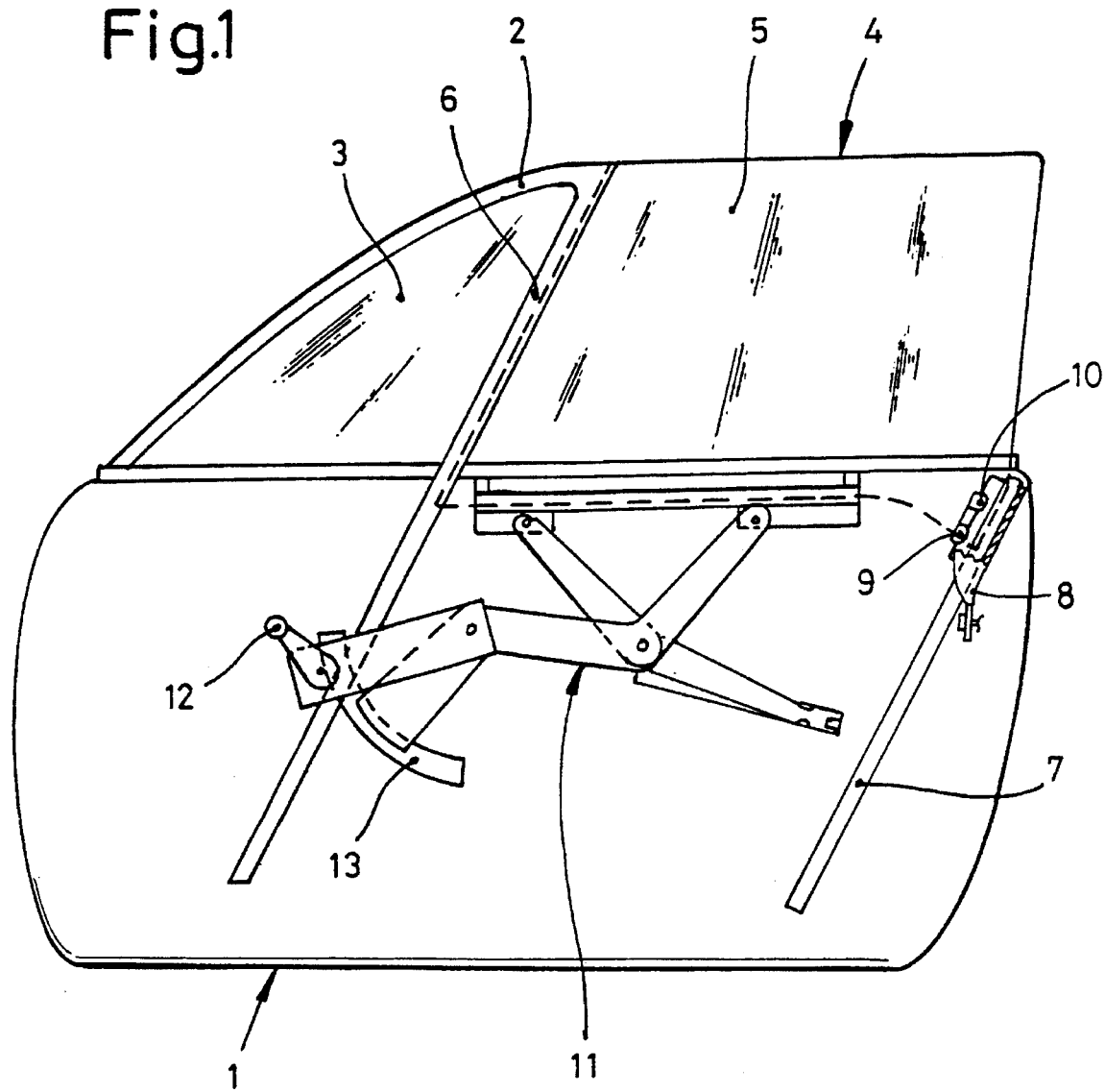
FIG. 1 is a side view of a vehicle door with a drop window and the parts for moving and guiding the window pane of the drop window.

FIG. 1 shows a vehicle door 1 which in the front region has a window frame 2 with a non-opening window 3. In the longitudinal direction of the vehicle behind this window 3, a drop window 4 designed according to the invention is arranged. The latter has a window pane 5 which is guided at its front and rear edges in each case in a guide rail 6, 7. The front guide rail 6 is guided out and up from the closed region of the vehicle door 1 and extends to the upper edge of the vehicle door 1. The window pane 5 is therefore constantly guided on its front edge over the entire height. The rear guide rail 7 does not extend out of the closed region of the vehicle door 1. At its upper or top end, a U-shaped guide sleeve 8 is arranged in which the window pane 5, just before reaching its topmost position, engages the sliding pieces 9, 10.

To move the window pane 5, a window raiser 11 of usual design is used. In the example shown, this is a scissors-type lifter which is activated by a hand crank 12 via a gear segment 13.

Figure 2:
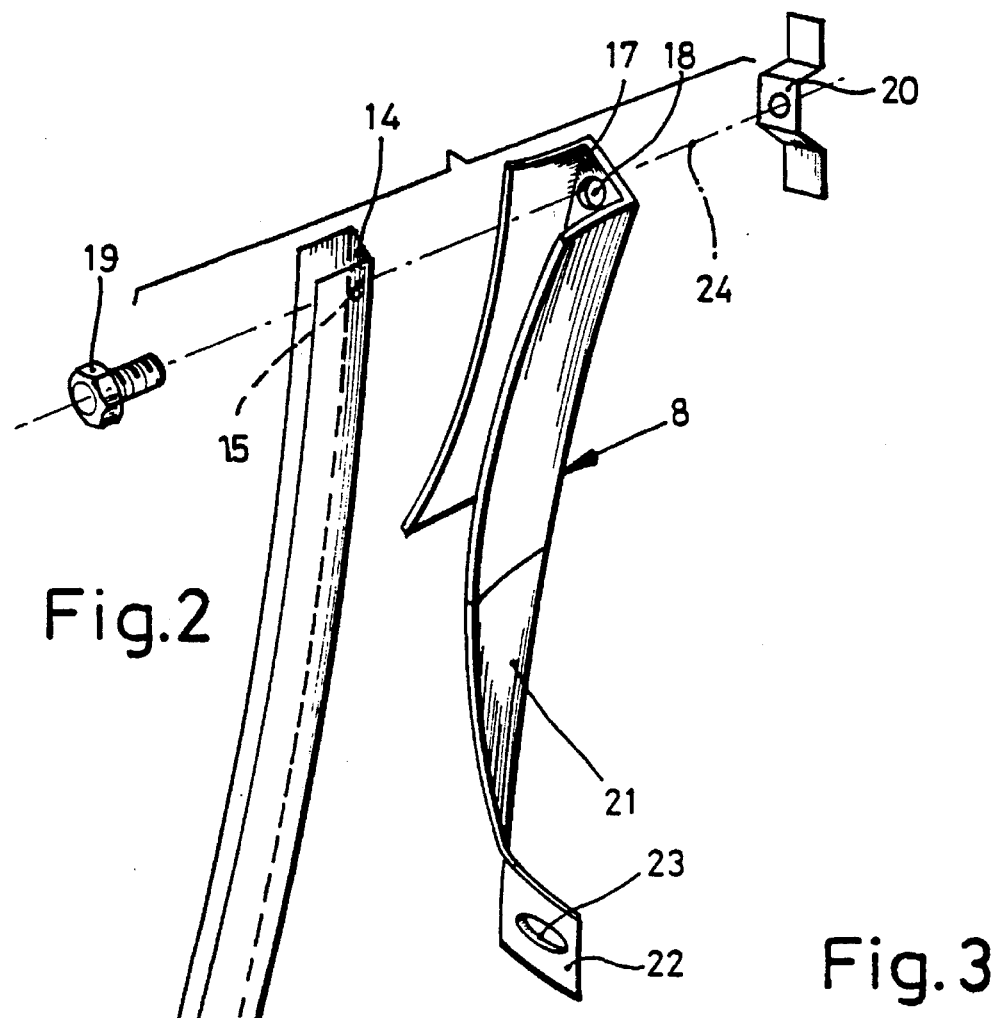
FIG. 2 is an exploded perspective view of a guide rail of the drop window with a guide sleeve and other components.

FIG. 2 shows the rear guide rail 7 in perspective and greatly enlarged relative to FIG. 1. This guide rail is designed with a U-shape that has a base 14. In the vicinity of its upper end, a hole 15 shown by the broken line is drilled. At the upper end of the guide rail 7, viewed from the right in FIG. 2, the guide sleeve 8 is pushed on. The latter also has a U-shaped cross-section and has a base 17 with a hole 18. A screw 19 can be screwed through the holes 15 and 18 into a holder 20 which is fixably adjoined to the door or vehicle structure, not shown.

At its bottom end, the guide sleeve 8 has an extension 21 with a screw-on strap 22 displaying an elongated hole 23. This screw-on strap 22 makes it possible to screw the bottom end of the guide sleeve 8 firmly within the door structure if the correct position of the guide sleeve 8 is adjusted by swiveling the guide sleeve 8 in advance about an axis 24 passing through the screw 19 and the holes 15, 18. In practice, the guide sleeve 8 is adjusted in such a way that the window pane 5 in its upper final position is pressed with its upper edge against the inside door seal.

Figure 3:
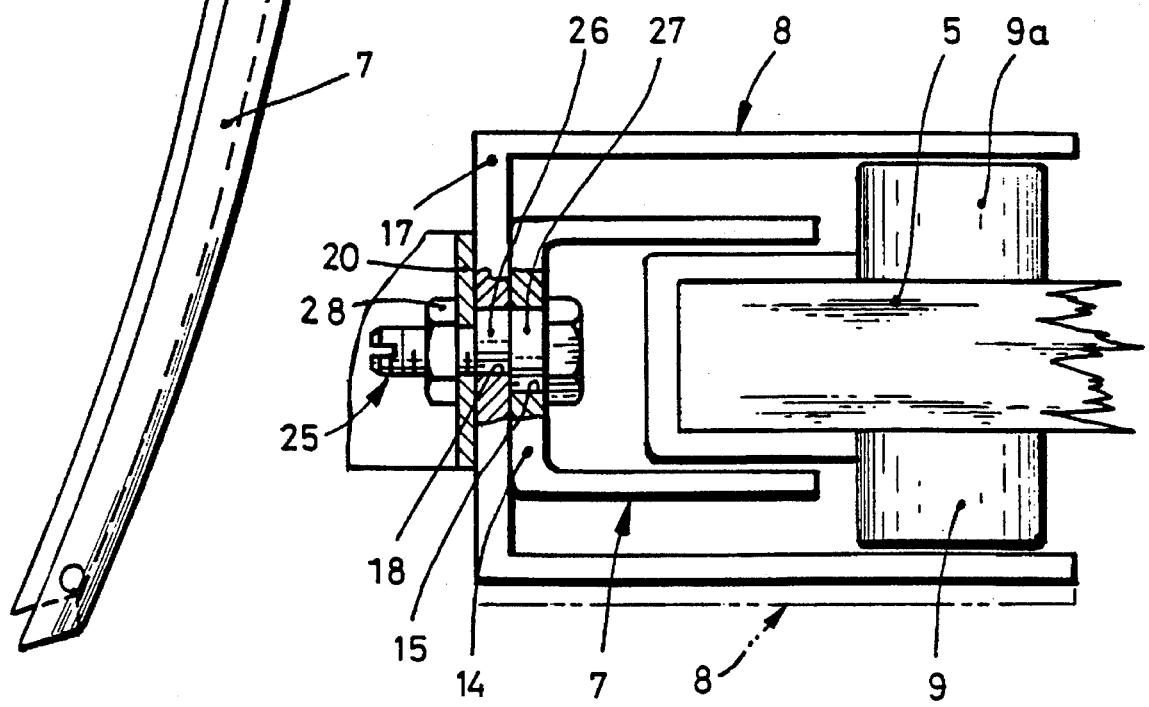
FIG. 3 is a partially cut-away top view of a second version of a guide rail with guide sleeve and adjusting means.

In FIG. 3, an especially simple adjuster arrangement is shown for adjusting the guide sleeve 8 relative to the guide rail 7. One recognizes an eccentric screw 25 which engages an eccentric region 26 in the hole 18 of the base 17 in the guide sleeve 8. With a non-eccentric region 27, the eccentric screw 25 sits in the hole 15 of the base 14 of the guide rail 7. A nut 28 holds the components penetrated by the eccentric screw 25 together. If the eccentric screw 25 is turned before tightening the nut 28, then the guide sleeve 8 is shifted relative to the guide rail 7 to the position shown in phantom.

In FIG. 3, one also sees how the window pane 5 in its final position is guided by the sliding pieces 9, 9a in the guide sleeve 8.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A drop window designed for a motor vehicle, with a window pane which can be raised in front and rear lateral guide rails from a lowered position to a window opening, in which there are provided an adjuster arrangement for adjusting the position of the completely raised window pane transversely to the plane of the window opening and in which at a top end of the rear guide rail there is situated a guide sleeve which engages slide members of the window pane directly before reaching the top position of the window pane, characterized in that the guide sleeve is a separate part from the rear guide rail engaging from a vehicle rear side over the rear guide rail and the adjuster arrangement for adjusting the guide sleeve are constructed transverse to the plane of the window pane.

2. A drop window according to claim 1 characterized in that a top end and a bottom end of the guide sleeve are releasably connected to two fixed parts of the motor vehicle, one of the fixed parts of the motor vehicle being higher than the other fixed part of the motor vehicle.

3. A drop window according to claim 2 characterized in that the top end of the guide sleeve is connected to the fixed part of the motor vehicle by means of a screw which at the same time serves to connect the rear guide rail to the fixed part of the motor vehicle, the screw passes through a base of the guide rail and a base of the guide sleeve.

4. A drop window according to claim 3 characterized in that the bottom end of the guide sleeve has an extension with a screw-on strap for attachment to a fixed part of the motor vehicle.

5. A drop window according to claim 1 characterized in that the guide sleeve is exclusively attached to the guide rail.

6. A drop window according to claim 1 characterized in that one end of the guide sleeve is held on a fixed part of the motor vehicle by means of an adjustable eccentric screw acting as the adjuster arrangement.

7. A drop window according to claim 6 characterized in that the eccentric screw at the same time locationally fixes the top end of the rear guide rail and has a first, non-eccentric region which passes through a hole in a base of the guide rail, this first screw region being followed by an eccentric screw region which engages in a hole in a base of the guide sleeve and onto which is screwed a nut on a side of the screw facing away from the rear guide rail.

\* \* \* \* \*